(No Model.) 2 Sheets—Sheet 1.

H. H. SHUFELDT & J. A. LYNCH.
FILTERING APPARATUS.

No. 416,866. Patented Dec. 10, 1889.

(No Model.) 2 Sheets—Sheet 2.

H. H. SHUFELDT & J. A. LYNCH.
FILTERING APPARATUS.

No. 416,866. Patented Dec. 10, 1889.

Witnesses:
Chas E Gaylord
J. H. Dyrenforth

Inventors
Henry H. Shufeldt,
John A. Lynch,
By Dyrenforth & Dyrenforth
Attys

United States Patent Office.

HENRY H. SHUFELDT AND JOHN A. LYNCH, OF CHICAGO, ILLINOIS, ASSIGNORS TO HENRY H. SHUFELDT & CO., OF SAME PLACE.

FILTERING APPARATUS.

SPECIFICATION forming part of Letters Patent No. 416,866, dated December 10, 1889.

Application filed April 23, 1889. Serial No. 308,260. (No model.)

*To all whom it may concern:*

Be it known that we, HENRY H. SHUFELDT, and JOHN A. LYNCH, citizens of the United States, residing at Chicago, in the county of Cook and State of Illinois, have invented a new and useful Improvement in Filtering Apparatus, of which the following is a specification.

Our invention relates to an improved apparatus for use, particularly, in preparing a solid feed for animals from the residue of the distillation of spirit, which residue is in the form of a liquid containing the grain, (from which the starch has been converted into alcohol and the latter distilled off,) the gluten and other nutrient portions of which are held in solution. Hitherto it has been a common practice to feed this residue in its liquid form to cattle housed at or in the neighborhood of the distilleries, or to have it carted away for feeding purposes, in order to dispose of it, and at the same time obtain a revenue therefrom, and thus avoid wasting the valuable by-product, which contains about fourteen pounds to each bushel of grain with which the mash is originally formed. Where it is not possible or practicable to dispose of the residue for feeding purposes it is wasted, thereby entailing a loss proportionate to the quantity, which in some distilleries amounts to hundreds of dollars' worth daily.

The object of our invention is to provide means whereby this valuable by-product may be not only saved without requiring its consumption on the premises or handling it in a liquid condition, and with comparatively little expense, but whereby, also, its bulk shall be greatly decreased and the nutrient properties concentrated by reducing it to solid form, thus also enhancing its value as feed by avoiding the necessity of the consumption of a comparatively large proportion of water to obtain the comparatively small proportion of nutriment held therein in solution. This object is accomplished by filtering the residue through itself under pressure to relieve it of the greater portion of the water, and then, if desired, drying the solid product of the filtering operation; and our invention consists in the general construction of an apparatus suitable for producing the desired filtration; and it also consists in details of the construction and combinations of parts.

Figure 1:
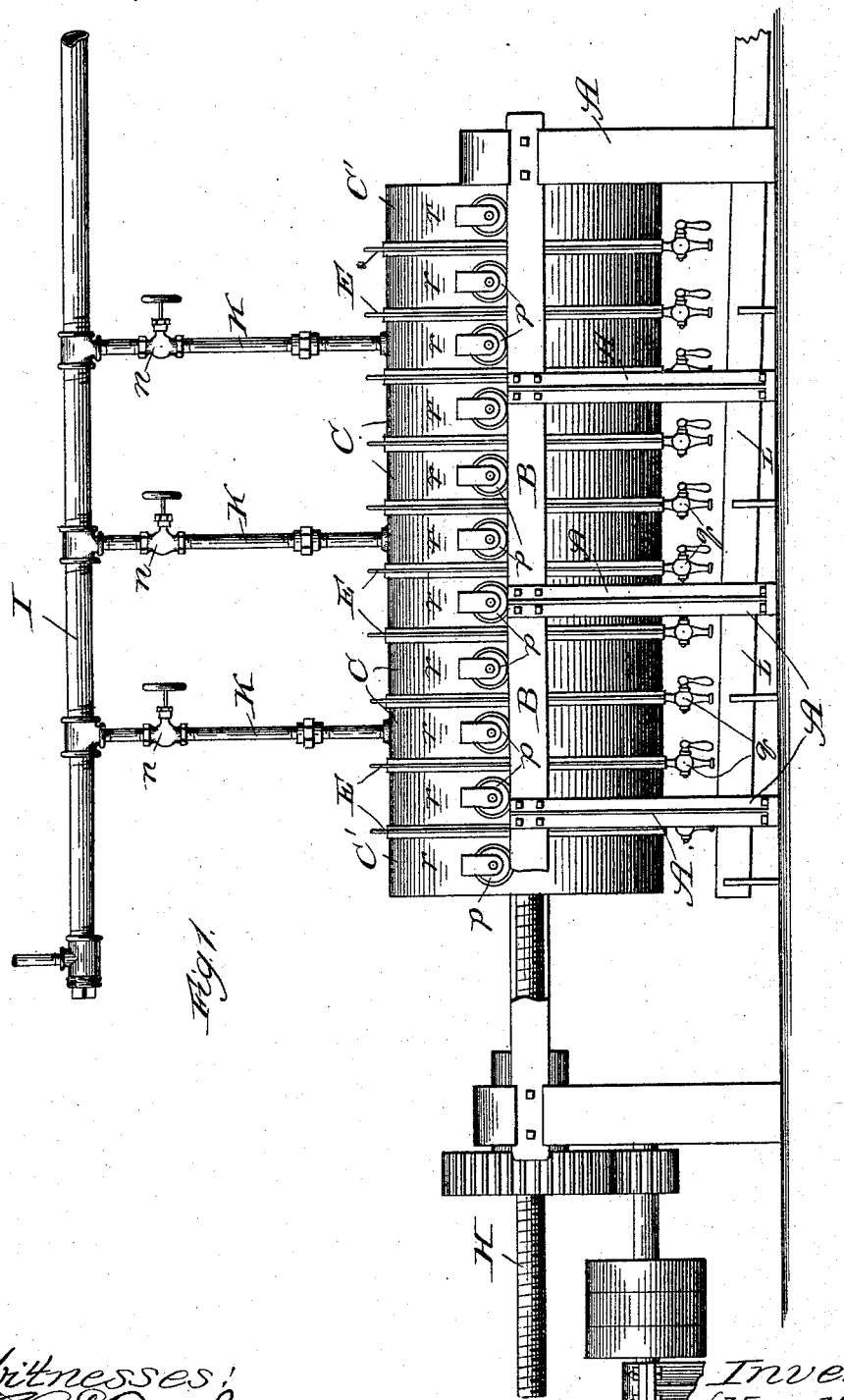
Figure 2:
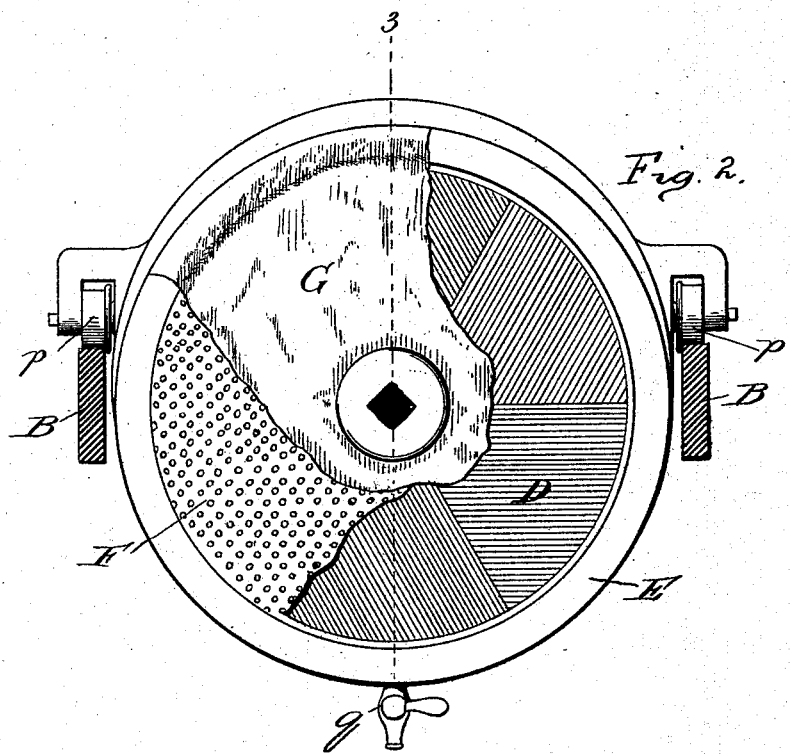
Figure 3:
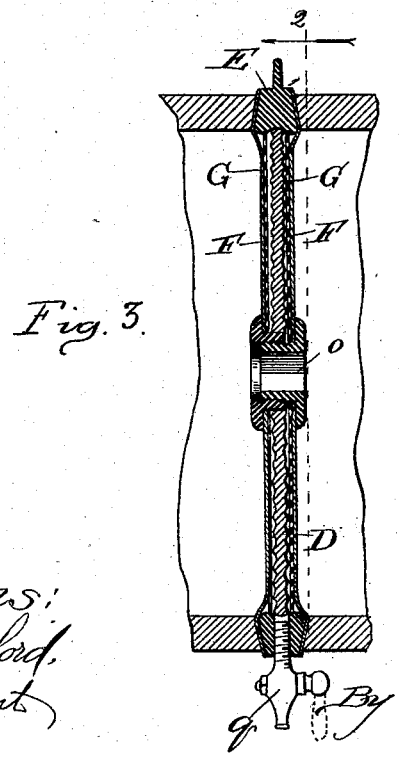

In the accompanying drawings, Figure 1 shows our improved filter in side elevation, partly broken. Fig. 2 is a broken sectional view showing details of construction, the section being taken on the line 2 of Fig. 3; and Fig. 3 is a section taken on the line 3 3 of Fig. 2.

A A are standards placed in two parallel rows at the desired distance apart, (one row only being shown in Fig. 1, owing to the nature of the view therein presented,) and B B are rails or supports sustained by the standards, the latter and the rails affording a heavy metal frame-work for the apparatus, but which may be modified in any desired manner without thereby departing from our invention.

The filter is composed of any desired number of intermediate sections C and two end sections C', each of the former comprising a massive wide metal ring $r$, of suitable diameter, having at each end a plate D, in the form, preferably, of an ordinary filter-press plate, which is corrugated in various directions on opposite sides and provided with a massive rim E, extending beyond opposite sides of the plate, which has a central opening $o$, the rim being grooved on its under side, as shown at $x$, adjacent to the opposite sides of the plate, to afford ducts around it, leading to a waste-cock $q$, extending through the rim to cause it to communicate with the ducts, perforated or sieve-like plates F against opposite surfaces of the plates D, and sheets of felt or other suitable filtering-cloth G, stretched over the perforated plates F. The filter is formed and disposed horizontally by adjusting a desired number of sections C, with the cocks $q$ extending outward together on the frame, each ring $r$ being provided on its opposite sides with a roller $p$, at which to support it on the rails B, and which serve to permit it to be readily moved thereon. The end sections C' comprise each a ring r, having an imperforate head.

Although the parts are described as of a form to render the filter of general cylindrical shape, we do not limit our construction to round rings, but intend the term "ring" shall include any suitable geometrical shape of that detail.

When the required number of sections C for a filter of desired length has been adjusted upon the frame between the end sections, they are forced tightly together and rendered water-tight by a screw H, supported to impinge against a head C', and turned, as by a suitable engine, (not shown,) with which it is properly geared for the purpose.

I is the feed-pipe, which communicates at one end with a suitable or ordinary force-pump, (not shown,) and the feed-pipe communicates through branch pipes K, provided with valves n, leading into the sides of the sections C, with the interior thereof. A filter for this purpose constructed upon a scale suitable to answer the needs of an ordinary distillery must necessarily comprise a considerable number of sections. The individual sections, moreover, must be made large, in order that each chamber may receive and retain a sufficient quantity of the solid constituent for effective work. The object sought is to have the accumulating solid constituents of the mixture serve as a filtering medium for that which follows, and this action we define as a filtration of the residue through itself. It is to be noted that in this case, unlike the filtration of beverages, the filtrate is waste, and the intercepted matter is the product preserved, and it is desirable to have this matter retain all the nutrient properties in nearly uniform distribution. To produce these effects, the construction of the filter must be such that without unduly retarding the flow through the apparatus the quantity of the residual filtering medium shall be as large as practicable. We effect this by the construction illustrated in the drawings, in which, it will be seen, each inlet-pipe K supplies a group of the intercommunicating sections. Thus the entering mixture, in order to reach the outlets, is compelled to diffuse itself throughout the whole of gradually-increasing intercepted solid matter in the group of sections adjacent to the inlet-pipe through which it enters. The indirect course which the greater part of the liquid is compelled to take through the accumulated solid matter adds to the uniformity of the distribution throughout the latter of the nutrient constituents.

Another advantage of having the inlet-pipes as few in number as practicable consistently with effective work is in the saving of time and labor in coupling and uncoupling them when the apparatus is emptied and readjusted. The drawings show one inlet-pipe to every third section, and this is the arrangement which we prefer for most purposes.

To operate the apparatus, the pump, which communicates in an ordinary manner with the receptacle containing the supply of the residue, is actuated to force the liquid material under a high pressure (one hundred and twenty pounds, more or less) into the filter, which it enters through the branch pipes K, and the liquid percolates through the filtering-cloths and perforated plates and finds its way along the corrugated plates D to the ducts x, which lead it to the previously-opened cocks q, whence it escapes into a trough L, or system of troughs, which may lead to the sewer, and in which any gluten that may have escaped from the filter may be saved by precipitation. As each section of the filter becomes filled to the desired extent with the solid portion of the residue, the mass itself affords filtering material through which to filter the supply of liquid, whereby most of the gluten and other nutriments held in solution are intercepted and saved, thus rendering the solid product highly nutritious. When each section is filled completely or to the desired extent with the solid matter, the supply is shut off; and subsequently the sections are separated on loosening the screw H and their contents removed, and, if desired, dried by any suitable means, as by a steam-drier. (Not shown.) When dried, the feed is finished, and may be readily handled, stored, or shipped; and, withal, it affords a highly nutritious, healthful, and cheap feed.

It should be remarked that the feed, instead of entering the top side of the filter, may enter the bottom side or points between the top and bottom, the object being to avoid feeding to an end of the apparatus. Obviously, also, the filter may, though not so practicably, be disposed vertically instead of horizontally.

What we claim as new, and desire to secure by Letters Patent, is—

1. A filter for filtering through itself the residue of spirit-distillation supplied to the apparatus under pressure, formed in sections intercommunicating within the filter, and having rings r, adjusted together and provided with side inlets for the residue to be filtered less in number than the sections, whereby each inlet supplies a group of sections, substantially as described.

2. A filter comprising a frame formed with standards A and tracks B, intercommunicating sections C, each comprising a ring r, having rollers p at opposite sides at which it is supported and movable on the rails B, corrugated plates D, having rims E, affording ducts x, leading to a discharge q, provided on each plate, and perforated plates F and filtering-cloth G at opposite ends of each ring, clamped between adjacent rings, and end sections C', between which the sections C are clamped, a screw H, for clamping the sections together, a supply-pipe I, and branch pipes K, leading from the supply-pipe laterally into a group of the intercommunicating sections C, the whole being constructed and arranged to operate substantially as and for the purpose set forth.

HENRY H. SHUFELDT.
JOHN A. LYNCH.

In presence of—
J. W. DYRENFORTH,
M. J. BOWERS.